United States Patent [19]

Stoewe et al.

[11] 4,410,225
[45] Oct. 18, 1983

[54] UNIVERSAL CONNECTOR KIT

[75] Inventors: Anneliese Stoewe; Gunter Hegner, both of Berlin, Fed. Rep. of Germany

[73] Assignee: Krone GmbH, Berlin, Fed. Rep. of Germany

[21] Appl. No.: 267,847

[22] Filed: May 28, 1981

[30] Foreign Application Priority Data

Jul. 17, 1980 [DE] Fed. Rep. of Germany ....... 3027047

[51] Int. Cl.³ .......................................... H01R 13/506
[52] U.S. Cl. .............................. 339/31 R; 339/196 R; 339/210 M
[58] Field of Search ............ 339/17 LC, 31 R, 31 M, 339/31 T, 107, 110 P, 113 R, 196 R, 196 A, 196 M, 206 P, 210 R, 210 M

[56] References Cited

U.S. PATENT DOCUMENTS

| 2,192,737 | 3/1940 | Folsom | 339/196 R |
| 2,398,996 | 4/1946 | Benander | 339/196 R |
| 3,031,637 | 4/1962 | Descarries | 339/196 R |
| 3,706,065 | 12/1972 | Knitter et al. | 339/196 M |
| 4,103,527 | 8/1978 | Douty et al. | 339/107 |
| 4,202,351 | 5/1980 | Biche | 339/113 R |
| 4,284,316 | 8/1981 | Debaigt | 339/113 R |

FOREIGN PATENT DOCUMENTS

| 1679316 | 6/1954 | Fed. Rep. of Germany . |
| 7406804 | 7/1974 | Fed. Rep. of Germany . |
| 2748842 | 5/1978 | Fed. Rep. of Germany . |

*Primary Examiner*—John McQuade
*Attorney, Agent, or Firm*—Brown & Martin

[57] ABSTRACT

In a universal connector (1) for a solderless, screwless and stripless system in which the opposing leaf spring arms of a contact element are oppositely torqued upon insertion of the conductor between them at a 45° angle. The connector is intended for testing, connecting and isolating conductor tracks. It is possible with this invention to obtain a twofold utilizability and thus an inexpensive manufacture of the shell halves (2, 2a) of the universal connector (1) by the fact that in two identical shell halves (2, 2a) of the universal connector (1) there are provided with either two contact blades (3, 3a) or a printed board (4).

6 Claims, 10 Drawing Figures

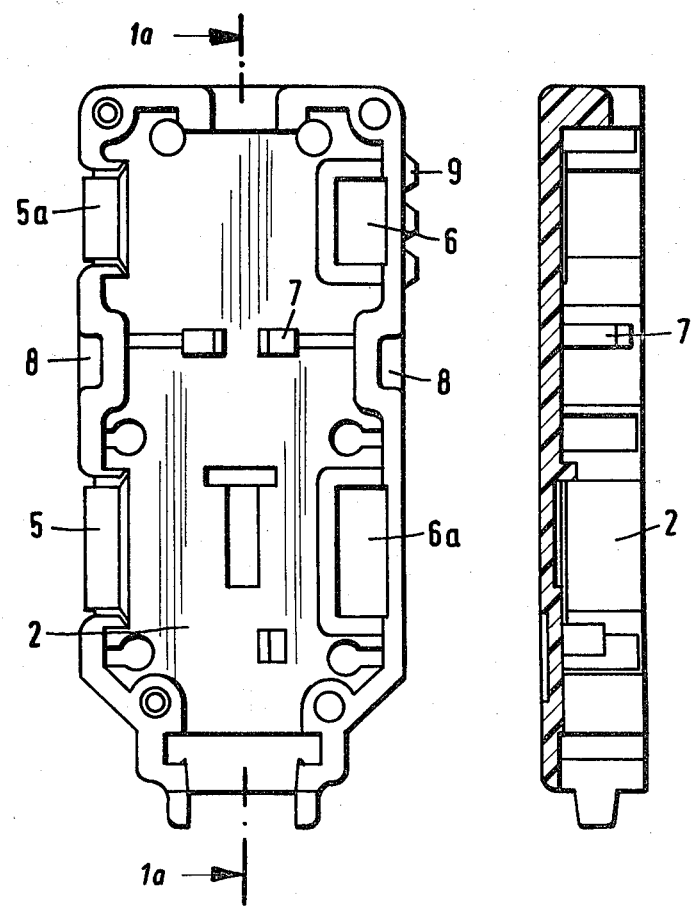
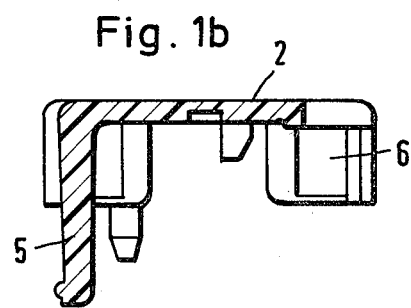

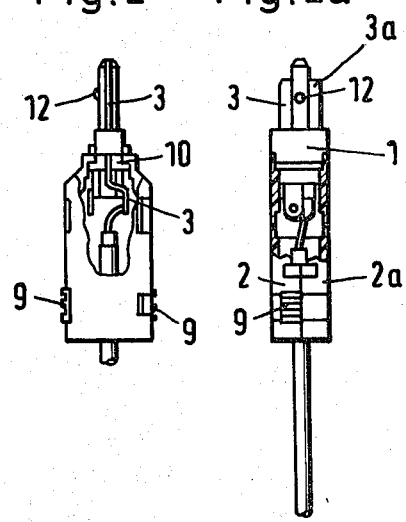
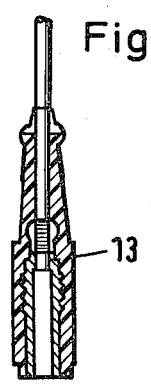

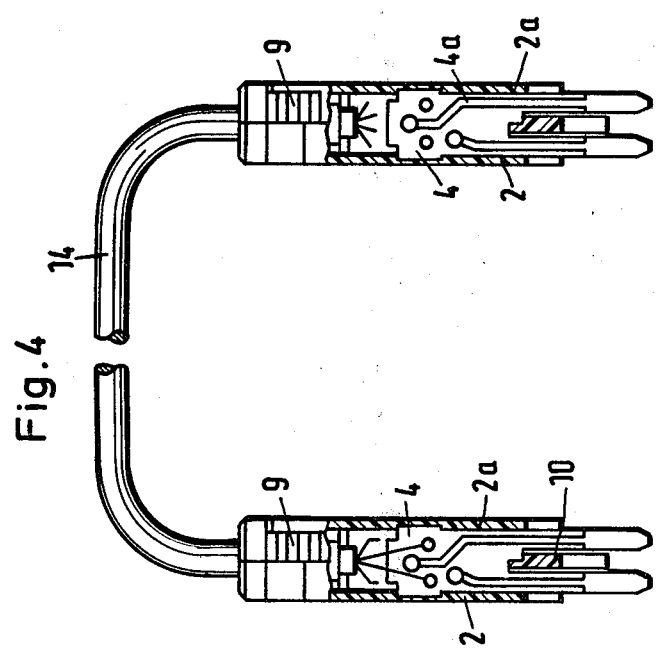
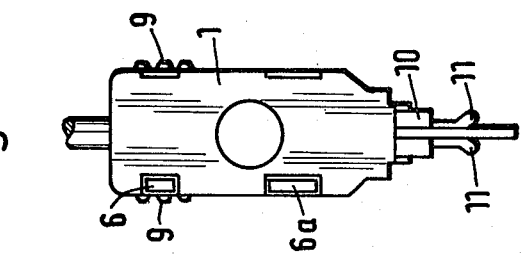
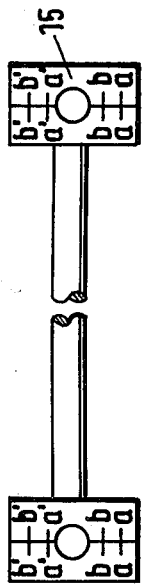

UNIVERSAL CONNECTOR KIT

The present invention relates to a universal connector for a solderless, screwless and stripless system in which the opposing leaf spring arms of the contact element are oppositely torques upon insertion of the conductor between them at a 45° angle—briefly the standard LSA-PLUS-system—for testing, connecting and isolating conductor tracks. It is the purpose of the invention to provide a simple and inexpensive connector of this type which in accordance with the great demand therefor may be manufactured at low cost as a mass article.

It is the object of the present invention to develop a universal connector of the type mentioned above, which may be inserted into the isolating or, respectively, terminal blocks of the LSA-PLUS-system.

An LSA-PLUS system is typically in the form of a multiplicity of springingly engaged contact pairs, aligned in a contact strip.

In accordance with the invention the above object is solved in that within the housing formed of two identical shell halves of the universal connector there are disposed one or two contact blades or a printed board.

It is one of the advantages of the present invention that by housing insert members it is possible to perform with this universal connector the most varied testing, connecting and isolating operations of conductor tracks in devices.

With one embodiment having two conductive independent contact blades, two normally touching contact elements in the LSA contact strip remain electrically connected through the contact blade and become externally accessible when this connector is inserted into the strip with the contact blade between the contact elements. When the printed circuit board configuration of this connector is inserted into the contact strip, each contact member so engaged is isolated from each of the others contacted by the connector. One insert member retains the independent blades in the housing, while another insert member of somewhat different configuration retains the printed circuit board.

A further advantage of the present invention resides in the twofold use of the connector shell halves, thus permitting economic manufacture.

An embodiment of the invention is shown in the accompanying drawing, in which:

FIG. 1 is a main view of a shell half of the universal connector;

FIG. 1a is a sectional view along the line 1a—1a of FIG. 1;

FIG. 1b is a plan view of the shell half of FIG. 1;

FIG. 2 is a broken-away view of the universal connector showing the connection between conductor and contact blade;

FIG. 2a is a side partial sectional view of the universal connector showing the contact blades;

FIG. 2b is a plan view of FIG. 2;

FIG. 3 is a sectional view of the coupling member;

FIG. 4 is a side view of two universal connectors with an inserted conductor board shown in section;

FIG. 5 is a front view of the universal connector; and

FIG. 6 is a plan view of FIG. 4.

The universal connector shown in FIGS. 2, 4, and 5 is inserted into the corresponding opening of the LSA-PLUS-strip and the contact elements thereof will tap the contact springs of the isolating block, or it is plugged onto the through-connected conductive path of the terminal strip.

FIG. 1 shows a shell half 2 which together with a mating identical shell half 2a forms the housing of universal connector 1. The two shell halves 2, 2a are latched by means of latching projections 5, 5a; two respective latching projections 5, 5a of one shell half 2 will enter two respective openings 6, 6a of the other shell half 2a—FIGS. 1, 1a and 1b.

It is possible to mount either contact blades 3, 3a variably connected to one another or printed boards 4 within the universal connector 1 itself with the aid of various insert members 10—FIGS. 2 and 4.

The insert member is captured between the housing shell halves and the contact blades or printed circuit board are cooperatively retained by the housing and respective insert.

The printed boards 4 may include soldered switching elements for electrical damping or for encoding the conductor track.

The outer surfaces of the universal connector 1 are provided with notches 8 for application of a withdrawing tool and with handling ribs 9 for withdrawing by hand from the contact strip.

As shown in FIGS. 2, 2a, 4, and 5 the insert 10 for the various contact elements is laterally guided and supported within the shell halves 2, 2a.

The insert 10 is formed with latching hooks 11 (FIG. 5) for clamping and latching the universal connector 1 after insertion thereof into the contact strip. In cases where for lack of space latching must be omitted, the inserts 10 are provided with latching bosses 12 (FIG. 2a).

The end face of the universal connector 1 indicates—as shown in FIGS. 2b and 6—the path of the through-connection by means of imprint 15.

Any simple nomenclature may be used on the cable receiving end of the housing to indicate the internal electrical connection paths in the connector.

As is further shown in FIG. 1, a tension relief means 7 for a cable, subh as cable 14 shown in FIG. 4, is provided within the universal connector 1.

As will be apparent from FIGS. 4 and 3 either two identical universal connectors 1 are used for connection in the LSA-PLUS-system, or one universal connector 1 including one or two coupling members 13 is used for connection to test equipment.

Coupling member 13 is a typical female socket connector which may be connected by means of a cable to connector 1.

As is further apparent from FIG. 4, four-wise cables may, if desired, form either single-, two- or four-wire cables by corresponding twisting of the conductors either individually or with each other in conventional manner.

The cable conductors or wires are connected by soldering to the conductor tracks 4a of the printed board 4 (FIG. 4) or, respectively, to the contact blades 3, 3a (FIGS. 2,2a)

The combination of cable 14 and two universal connectors 1 forms test or patch cord from one LSA-PLUS contact strip to another.

We claim:

1. A universal connector plug assembly kit for selective insertion into a contact strip having a multiplicity of pairs of normally closed, springingly engaged contact elements, to selectively make external electrical connection to said normally closed contact pairs and to make electrical connection independently to each contact of a contact pair, said assembly kit comprising:
- at least one pair of identical electrically insulative shell halves adapted to fit together to form a unitary housing adapted to receive at one end a cable having at least one wire therein;
- at least one pair of separate, flattened, elongated, electrically conductive first contact members;
- at least one unitary, insulative, second contact member having two spaced planar legs connected at one end, said second contact member having an electrically conductive path on at least one planar side of one of said legs;
- at least one electrically insulative first insert member adapted to be captured between said two shell halves at the other end of said housing and retained therein, said first insert member being adapted to retain, in cooperation with said shell halves, at least one of said first contact members in a position extending from inside said housing outwardly from said other end thereof;
- at least one electrically insulative second insert member adapted to be captured between said two shell halves at the other end of said housing and retained therein, said second insert member being adapted to retain, in cooperation with said shell halves, said second contact member in a position extending from inside said housing outwardly from said other end thereof;
- said first and second contact members, when assembled with said housing and respective insert member being adapted for permanent connection with the wire from said cable.

2. A universal connector kit according to claim 1, characterized in that each shell half (2, 2a) is provided with two latching projections (5, 5a) and two openings (6, 6a).

3. A universal connector kit according to claim 1, characterized in that a tension relief means (7) is provided within the universal connector (1).

4. A universal connector kit according to claim 1, characterized in that notches (8) and handling ribs (9) are formed on the outer surfaces of the universal connector (1).

5. A universal connector kit according to claim 1, characterized in that latching hooks (11) are provided on one of said insert members.

6. A universal connector kit according to claim 1, characterized in that a variable imprint (15) is provided on the end face of the universal connector (1) to represent and indicate the switching function of the plugs and, respectively, the through-connection of the cable wires.

* * * * *